(12) United States Patent
Sambuichi et al.

(10) Patent No.: US 11,742,714 B2
(45) Date of Patent: Aug. 29, 2023

(54) MOTOR AND DRIVING MEMBER

(71) Applicant: NIDEC CORPORATION, Kyoto (JP)

(72) Inventors: Hiroshi Sambuichi, Kyoto (JP); Ting Huang, Dalian (CN); Honglu Che, Dalian (CN)

(73) Assignee: NIDEC CORPORATION, Kyoto (JP)

( * ) Notice: Subject to any disclaimer, the term of this patent is extended or adjusted under 35 U.S.C. 154(b) by 39 days.

(21) Appl. No.: 17/676,234

(22) Filed: Feb. 21, 2022

(65) Prior Publication Data
US 2022/0271606 A1  Aug. 25, 2022

(30) Foreign Application Priority Data
Feb. 23, 2021  (CN) .......................... 202110201166.X

(51) Int. Cl.
H02K 5/16   (2006.01)
H02K 3/28   (2006.01)
H02K 3/48   (2006.01)

(52) U.S. Cl.
CPC .............. *H02K 5/16* (2013.01); *H02K 3/28* (2013.01); *H02K 3/48* (2013.01); *H02K 2203/09* (2013.01); *H02K 2211/03* (2013.01)

(58) Field of Classification Search
CPC .. H02K 5/16; H02K 3/28; H02K 3/48; H02K 2203/09; H02K 2211/03; H02K 3/50; H02K 5/1735; H02K 11/20; H02K 13/00; H02K 11/0094

USPC ...................................................... 310/71, 90
See application file for complete search history.

(56) References Cited

U.S. PATENT DOCUMENTS

| | | | |
|---|---|---|---|
| 11,038,392 B2 | 6/2021 | Fukunaga | |
| 11,081,870 B2 | 8/2021 | Ogawa et al. | |
| 2011/0001388 A1* | 1/2011 | Fujii | H02K 3/522 310/257 |
| 2017/0201150 A1* | 7/2017 | Haga | H02K 3/522 |
| 2019/0044110 A1* | 2/2019 | Sheeks | H02K 5/15 |
| 2020/0067381 A1 | 2/2020 | Suzuki et al. | |
| 2020/0185997 A1* | 6/2020 | Hirasawa | H02K 7/14 |
| 2022/0271606 A1* | 8/2022 | Sambuichi | H02K 3/50 |

* cited by examiner

*Primary Examiner* — Ahmed Elnakib
(74) *Attorney, Agent, or Firm* — JCIPRNET

(57) ABSTRACT

A motor and a driving member are provided. The motor has a rotor centered on and rotatable along a central axis and having a shaft and a bearing holding the shaft to be rotatable; a stator radially opposite to the rotor; a coil winding around the stator; a bearing holder; a bus bar holder on one or the other side of the bearing holder in an axial direction; a substantially cylindrical housing having an opening on a top side in the axial direction. The rotor, the stator, the bearing holder, and the bus bar holder are in the housing. A power bus bar and a signal bus bar are integrally formed on the bus bar holder which axially pushes against and is fixed to the bearing holder; a circuit board and a sensor are between the holders. This structure reduces an axial dimension of the motor and miniaturizes the motor.

16 Claims, 3 Drawing Sheets

MOTOR AND DRIVING MEMBER

CROSS-REFERENCE TO RELATED APPLICATION

The present invention claims priority under 35 U.S.C. § 119 to Chinese Application No. 202110201166.X, filed on Feb. 23, 2021, the entire content of which is incorporated herein by reference.

FIELD OF THE INVENTION

The disclosure relates to an electro-mechanical field and particularly relates to a motor and a driving member.

BACKGROUND

In a conventional brushless motor, a bearing holder also serves as a cover of the motor and is located at an opening of a housing of the motor to package the main body of the motor into the housing. However, in the existing structure of the bearing holder, a bus bar component is located in the housing of the motor, and the bearing holder acting as the cover and a bus bar holder are spaced from each other by a certain distance in an axial direction, which is detrimental to reduction of an axial dimension of the motor.

It should be noted that the above introduction to the technical background is only set forth to provide a clear and thorough description of the technical solution of the disclosure and facilitate understanding of those skilled in the art. It should not be construed that the above technical solutions are commonly known to those skilled in the art just because these solutions are described in the background art of this disclosure.

SUMMARY

In order to solve at least one of the above-mentioned problems or other similar problems, an embodiment of the disclosure provides a motor and a driving member. By arranging a bus bar component on an outer side of a cover of the motor and axially pushing the bus bar component against the motor and fixing them to each other, and arranging a sensor and a circuit board between the bus bar component and the motor, an axial dimension of the motor is reduced, which is conducive to miniaturization of the motor.

According to an aspect of an embodiment of the disclosure, a motor is provided, and the motor includes:

a rotor, configured to be centered on and rotatable along a central axis and having a shaft and a bearing holding the shaft to be rotatable;

a stator, arranged opposite to the rotor in a radial direction;

a coil, winding around the stator;

a bearing holder, holding the bearing;

a bus bar holder, located on one side or the other side of the bearing holder in an axial direction; and a housing, shaped as or substantially shaped as a cylinder having an opening on a top side of the housing in the axial direction, where the rotor, the stator, the bearing holder, and the bus bar holder are located in the housing;

wherein the bus bar holder axially pushes against and is fixed to the bearing holder at a fixing part, a power bus bar and a signal bus bar are integrally formed on the bus bar holder, and a circuit board and a sensor are located between the bus bar holder and the bearing holder.

In one or more embodiments, the bearing holder serves as a cover of the motor, and the bus bar holder is located on the one side of the bearing holder in the axial direction.

In one or more embodiments, the fixing part where the bus bar holder and the bearing holder are fixed is axially closer to the other side in the axial direction than an edge on one side of the housing in the axial direction.

In one or more embodiments, at least a portion of the bearing holder is recessed toward the other side in the axial direction and defines a recess, the sensor is located in the recess, and one side of the recess in the axial direction is covered by the bus bar holder.

In one or more embodiments, the bus bar holder has a protruding edge protruding toward the other side in the axial direction, and an outer circumference of the protruding edge and an inner circumference of the recess of the bearing holder are press-fitted.

In one or more embodiments, the circuit board axially pushes against and is fixed to a surface of the bus bar holder on the other side in the axial direction, or the circuit board axially pushes against and is fixed to a surface of the bearing holder on the one side in the axial direction, and the circuit board is located on an inner side of the protruding edge in the radial direction.

In one or more embodiments, an outer circumference of the bearing holder in the radial direction has an outer circumferential edge press-fitted to the housing, the bearing holder has a riveting part extending in the radial direction, the bus bar holder has a riveted part extending in the radial direction, the riveting part and the riveted part are located on an outer side of the recess in the radial direction, and the riveting part and the riveted part are riveted and fixed in the axial direction.

In one or more embodiments, an end of the signal bus bar is exposed from one side of the bus bar holder facing the bearing holder, the circuit board is arranged on the one side of the bus bar holder facing the bearing holder, and the end of the signal bus bar is inserted into an electrical connection hole of the circuit board.

According to an aspect of an embodiment of the disclosure, a driving member is provided, and the driving member includes the motor provided in any of the previous embodiments.

One of the beneficial effects provided in one or more embodiments of the disclosure lies in that the bus bar component is arranged on the outer side of the cover of the motor, the bus bar component and the motor are axially pushed against and fixed to each other, and the sensor and the circuit board are arranged between the bus bar component and the motor, whereby the axial dimension of the motor is reduced. This is conducive to miniaturization of the motor.

The above and other elements, features, steps, characteristics and advantages of the present disclosure will become more apparent from the following detailed description of the preferred embodiments with reference to the attached drawings.

BRIEF DESCRIPTION OF THE DRAWINGS

In the following detailed description with reference to the accompanying drawings, the above and other objectives, features and advantages of the embodiments of the present disclosure will become more apparent. In the accompanying drawings.

DETAILED DESCRIPTION

With reference to the accompanying drawings, the foregoing and other features of this disclosure will become apparent with reference to the following description. In the description and drawings, specific implementations of the disclosure are explicitly disclosed, which indicate some implementations in which the principles of the disclosure can be adopted. It should be understood that the disclosure is not limited to the described implementations, on the contrary, the disclosure includes all modifications, variations and equivalent replacement which fall within the scope of the appended claims.

In one or more embodiments of the disclosure, the term "and/or" includes any one and all combinations of one or more of the associated terms. The terms "comprising", "including", "having" and the like refer to the existence of the described features, elements, components or members, but do not exclude the presence or addition of one or more other features, elements, components or members.

In one or more embodiments of the disclosure, the singular forms "a", "the", etc. may include plural forms, which should be broadly understood as "a kind of" or "a type of" rather than being limited to the meaning of "one". In addition, the term "the" should be construed to involve both singular and plural forms, unless otherwise indicated. Moreover, the term "according to" should be construed as "at least partially according to . . . ", and the term "based on" should be construed as "at least partially based on . . . " unless otherwise indicated.

In addition, in the following description of the disclosure, for the convenience of description, a direction extending along a central axis O of the motor or a direction parallel to said direction is referred to as an "axial direction"; a direction from a bottom of a housing of the motor toward a bus bar holder is referred to as a "top side in the axial direction" or "one side in the axial direction"; a direction from the bus bar holder toward the bottom of the housing of the motor is referred to as a "bottom side in the axial direction" or "the other side in the axial direction". A radial direction centered on the central axis O is referred to as the "radial direction", a direction approaching the central axis O is referred to as an "inner side in the radial direction", and a direction away from the central axis O is referred to as an "outer side in the radial direction". A direction around the central axis O is referred to as a "circumferential direction". However, it should be noted that the above descriptions of directions are only for convenience of description and do not limit the direction along which the motor faces during use and manufacturing.

Implementation manners of one or more embodiments of the disclosure are described below with reference to the drawings.

First Aspect of an Embodiment of the Disclosure

An embodiment of the disclosure provides a motor.

Figure 1:
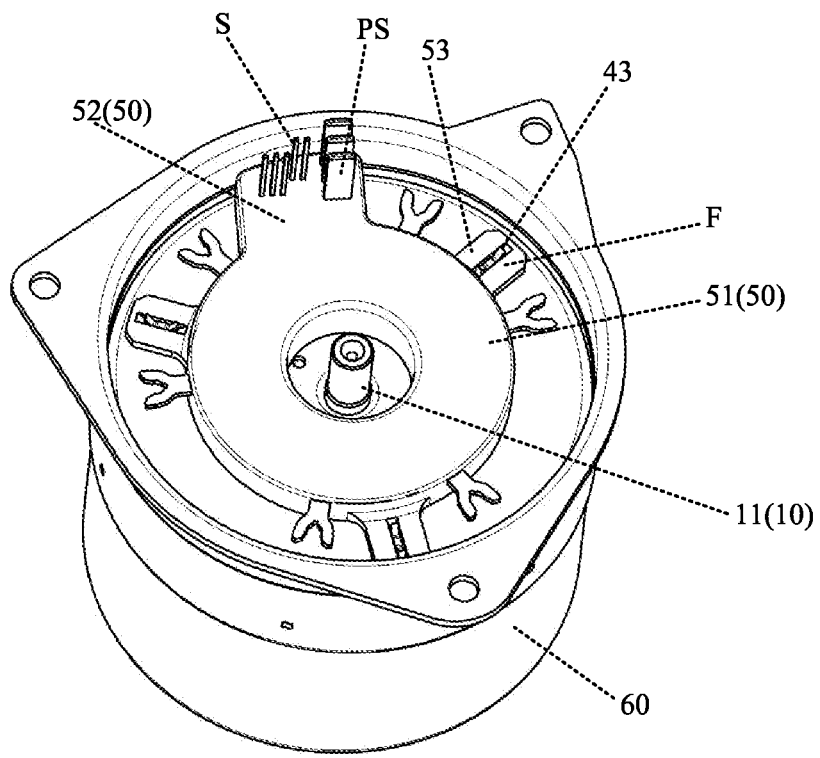
FIG. 1 is a schematic view illustrating a motor according to an exemplary embodiment of the disclosure.
Figure 2:
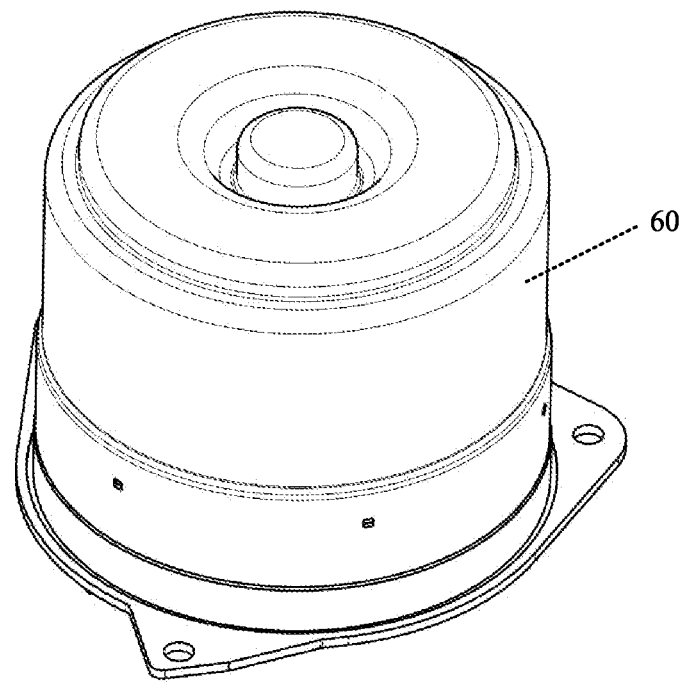
FIG. 2 is a schematic view illustrating the motor depicted in FIG. 1 at another angle.
Figure 3:
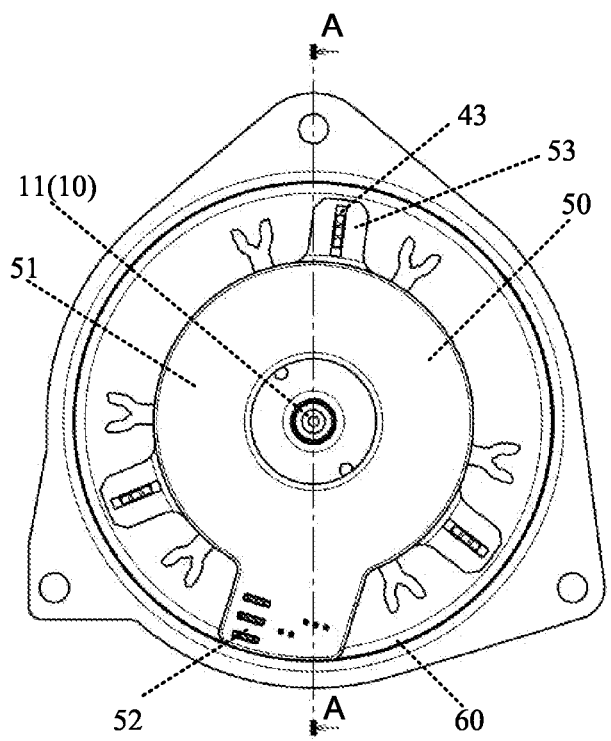
FIG. 3 is a top view illustrating the motor depicted in FIG. 1.
Figure 4:
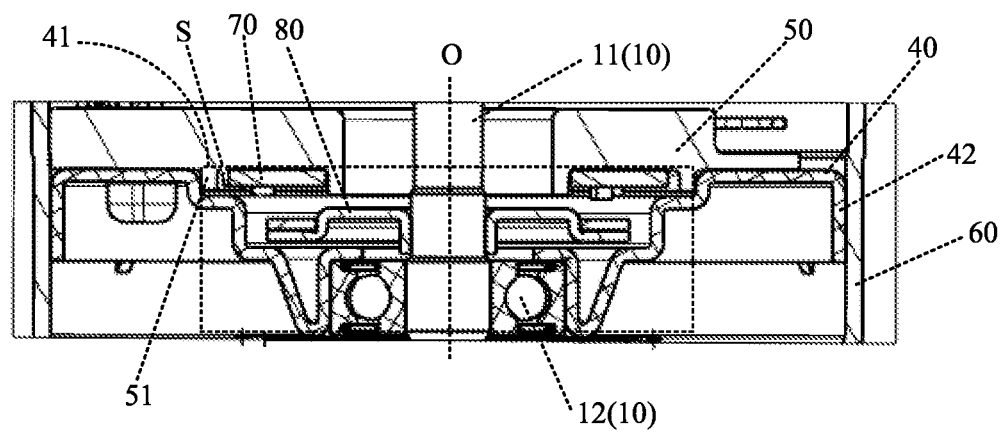
FIG. 4 is a schematic view illustrating an axial section of the motor taken along a direction A-A shown in FIG. 3.

FIG. 1 is a schematic view illustrating a motor according to an exemplary embodiment of the disclosure, which shows an observation result of the motor from one side in an axial direction. FIG. 2 is a schematic view illustrating the motor depicted in FIG. 1 at another angle, which shows an observation result of the motor from the other side in the axial direction. FIG. 3 is a top view illustrating the motor depicted in FIG. 1. FIG. 4 is a schematic view illustrating an axial section of the motor taken along a direction A-A shown in FIG. 3, which shows a partial structure of the motor. As illustrated in FIG. 1 to FIG. 4, the motor provided in an embodiment of the disclosure includes:

a rotor 10, configured to be centered on and rotatable along a central axis O, the rotor having a shaft 11 and a bearing 12 holding the shaft 11 to be rotatable;

a stator (not shown in the drawings), arranged opposite to the rotor 10 in a radial direction;

a coil (not shown in the drawings), winding around the stator;

a bearing holder 40, holding the bearing 12;

a bus bar holder 50, located on one side or the other side of the bearing holder 40 in an axial direction; and a housing 60, shaped as or substantially shaped as a cylinder having an opening on a top side of the housing 60 in the axial direction, wherein the rotor 10, the stator, the bearing holder 40, and the bus bar holder 50 are located in the housing 60.

In the embodiment of the disclosure, the bus bar holder 50 axially pushes against and is fixed to the bearing holder 40 at a fixing part, a power bus bar PS and a signal bus bar S are integrally formed on the bus bar holder 50, and a circuit board 70 and a sensor 80 are located between the bus bar holder 50 and the bearing holder 40.

In the embodiment of the disclosure, the structure of the bus bar holder 50 allows an axial direction of the motor to be reduced, which is conducive to miniaturization of the motor.

In one or more embodiments, as shown in FIG. 4, the bearing holder 40 serves as a cover of the motor, and the bus bar holder 50 is located on the one side of the bearing holder 40 in the axial direction. By arranging the bus bar holder 50 an the outer side of the cover of the motor, which facilitates interface molding and enhances the degree of design freedom.

Figure 5:
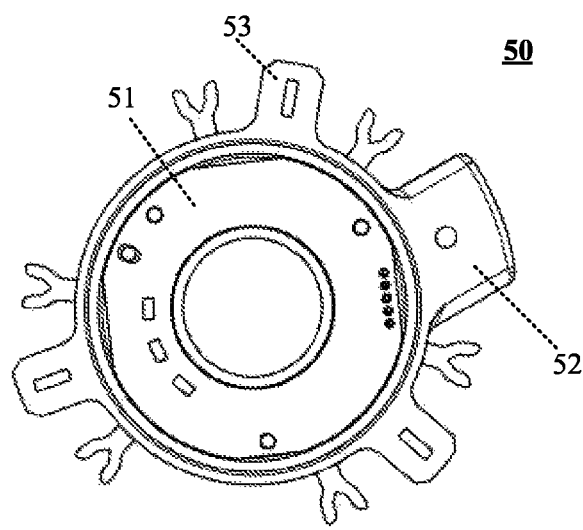
FIG. 5 is a schematic view illustrating a bus bar holder of the motor depicted in FIG. 1 according to an exemplary embodiment of the disclosure.

FIG. 5 is a schematic view illustrating the bus bar holder 50 of the motor depicted in FIG. 1 according to an exemplary embodiment of the disclosure.

In one or more embodiments, as shown in FIG. 1 to FIG. 5, the bus bar holder 50 has a main body 51 and an interface 52 extending along the axial direction from an edge of the main body 51 on an outer side in a radial direction. As shown in FIG. 1 and FIG. 3, the interface 52 at least partially overlaps an edge of the housing 60 in the axial direction.

In the previous embodiment, as shown in FIG. 1, the interface 52 of the bus bar holder 50 and the edge of the housing 60 push against each other in the axial direction. Hence, the interface of the bus bar holder 50 may be reliably supported through the edge of the housing 60.

In one or more embodiments, as shown in FIG. 1, a fixing part F where the bus bar holder 50 and the bearing holder 40 are fixed is axially closer to the other side in the axial direction than the edge on one side of the housing 60 in the axial direction. That is, the fixing part F is located on the bottom side the opening of the housing 60 in the axial direction; thereby, an axial dimension of the motor may be further reduced.

In the previous embodiment, how the bus bar holder 50 and the bearing holder 40 are fixed to each other is not limited, and the two may be press-fitted and fixed to each other, may be riveted and fixed to each other, and so on.

In one or more embodiments, as shown in FIG. 4, at least a portion of the bearing holder 40 is recessed toward the other side in the axial direction (i.e., the bottom side shown in FIG. 4) and defines a recess 41 (a part of the bearing holder 40 shown by dotted lines). The sensor 80 is located in the recess 41, and one side of the recess 41 in the axial direction (i.e., the top side shown in FIG. 4) is covered by the bus bar holder 50.

In the previous embodiment, via the bus bar holder 50, the recess 41 has a closed structure, so as to prevent foreign objects from entering the motor and extend the service life of the motor.

In one or more embodiments, as shown in FIG. 4, the bus bar holder 50 has a protruding edge 51 protruding toward the other side in the axial direction (i.e., the bottom side shown in FIG. 4), and an outer circumference of the protruding edge 51 and an inner circumference of the recess 41 of the bearing holder 40 are press-fitted, which should however not be construed as a limitation in the disclosure. The outer circumference of the protruding edge 51 and the inner circumference of the recess 41 of the bearing holder 40 may also be mated by clearance fit.

In the previous embodiment, through the structure of the protruding edge 51, the bus bar holder 50 may seal the recess 41 where the sensor 80 is located, so as to prevent foreign objects from entering the sensor 80 and affecting the sensing performance of the sensor 80 and extend the service life of the motor.

In the previous embodiment, the press-fitted or the clearance-fitted structures may further improve the concentricity of the bus bar holder 50 and the bearing holder 40 and ensure that the bus bar holder 50 and the bearing holder 40 are fixed to each other. The press-fitted or clearance-fitted location is the fixing part F located on the bottom side of the opening of the housing 60 in the axial direction (i.e., the other side in the axial direction). Hence, the axial dimension of the motor may be reduced, which is conducive to miniaturization of the motor.

In one or more embodiments, as shown in FIG. 4, the circuit board 70 axially pushes against and is fixed to a surface of the bus bar holder 50 on the other side in the axial direction (i.e., the bottom side shown in FIG. 4), or the circuit board 70 axially pushes against and is fixed to a surface of the bearing holder 40 facing the bearing holder 40 on the one side in the axial direction (i.e., the top side shown in FIG. 4), and the circuit board 70 is located on an inner side of the protruding edge 51 in the radial direction.

In the previous embodiment, through arranging the circuit board 70 on the surface of the bus bar holder 50 on the bottom side in the axial direction or on the surface of the bearing holder 40 on the top side in the axial direction, the circuit board 70 may be sealed, and the axial dimension of the motor is further reduced, which is conducive to miniaturization of the motor.

In the previous embodiment, when the circuit board 70 is arranged on the surface of the bus bar holder 50 on the bottom side in the axial direction, the circuit board 70 may be located near the inner side of the protruding edge 51 in the radial direction, and thereby the axial space of the motor may be saved.

In one or more embodiments, as shown in FIG. 4, an outer circumference of the bearing holder 40 in the radial direction has an outer circumferential edge 42 press-fitted to the housing 60. As shown in FIG. 1 and FIG. 3, the bearing holder 40 has a riveting part 43 extending in the radial direction, the bus bar holder 50 has a riveted part 53 extending in the radial direction, the riveting part 43 and the riveted part 53 are located on an outer side of the recess 41 in the radial direction, and the riveting part 43 and the riveted part 53 are riveted and fixed in the axial direction.

In the previous embodiment, being "riveted and fixed in the axial direction" indicates that a force-applying direction in which the riveting operation is performed is the axial direction.

In the previous embodiment, as shown in FIG. 4, the outer circumferential edge 42 is bent downward along the bottom side in the axial direction from the edge of the bearing holder 40 on the outer side in the radial direction, which defines a flange design. Thereby, the fixing strength of the bearing holder 40 and the housing 60 is enhanced.

In the previous embodiment, when the bearing holder 40 and the bus bar holder 50 are riveted and fixed through the radially extended riving part 43 and riveted part 53, the design of the outer circumferential edge 42 is able to prevent the bearing holder 40 from being deformed.

In the previous embodiment, the location where the riving part 43 and the riveted part 53 are riveted and fixed is the fixing part F. Since the fixing part F is located on the bottom side of the opening of the housing 60 in the axial direction, the axial dimension of the motor may be reduced, which is conducive to miniaturization of the motor.

In one or more embodiments, as shown in FIG. 4, an end of the signal bus bar S is exposed from one side of the bus bar holder 50 facing the bearing holder 40, the circuit board 70 is arranged on the one side of the bus bar holder 50 facing the bearing holder 40, and the end of the signal bus bar S is inserted into an electrical connection hole of the circuit board 70.

In the previous embodiment, said structure allows the power terminal and the signal terminal to be integrally formed.

It is worth noting that the above description only exemplifies the structure of the motor in the embodiments of the disclosure, but the embodiments of the disclosure are not limited thereto, and appropriate modifications can also be made on the basis of the above various embodiments. In addition, each component provided in the previous embodiment is merely exemplary and should not be limited to what is provided in the embodiments of the disclosure, and specific details regarding each component may also be derived from related technologies; in addition, one or more components not shown in FIG. 1 to FIG. 5 may be added, or one or more components shown in FIG. 1 to FIG. 5 may be removed. Details of other components and structures of the motor may be derived from related technologies and thus will not be described hereinafter.

According to one or more embodiments of the disclosure, the bus bar component is arranged on the outer side of the cover of the motor, the bus bar component and the motor are axially pushed against and fixed to each other, and the sensor and the circuit board are arranged between the bus bar component and the motor, whereby the axial dimension of the motor is reduced. This is conducive to miniaturization of the motor.

Second Aspect of an Embodiment of the Disclosure

An embodiment of the disclosure provides a driving member, and the driving member includes the motor provided in the first aspect of the embodiment of the disclosure. Since the structure of the motor is already elaborated in the first aspect of the embodiment of the disclosure, the content thereof is incorporated herein, and no further description is provided herein.

In one or more embodiments of the disclosure, the driving member may be a driving member of any electronic device, and details of other components of the driving member may be derived from related technologies and thus will not be described hereinafter.

Third Aspect of an Embodiment of the Disclosure

An embodiment of the disclosure provides an electronic device, the electronic device has the driving member provided in the second aspect of the embodiment of the disclosure, and the driving member includes the motor provided in the first aspect of the embodiment of the disclosure. Since the structure of the motor is already elaborated in the first aspect of the embodiment of the disclosure, the content thereof is incorporated herein, and no further description is provided herein.

In one or more embodiments of the disclosure, the electronic device may be any electronic device quipped with a motor, such as home appliances including indoor units of air conditioners, outdoor units of air conditioners, water dispensers, washing machines, sweepers, compressors, blowers, mixers, and so on, industrial devices including pumps, conveyors, elevators, standard industrial general purpose machines, wind generators, grinders, traction motors, and so on, various information processing devices, and automotive parts including automobile electric power steering system, automobile sunroof adjustment parts, seat adjustment parts, transmissions, brakes, and so on.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

According to one or more embodiments of the disclosure, the present disclosure is able to be applied in, for instance, a motor and a driving member.

What is claimed is:

1. A motor, comprising:
   a rotor, configured to be centered on and rotatable along a central axis, the rotor having a shaft and a bearing holding the shaft to be rotatable;
   a stator, arranged opposite to the rotor in a radial direction;
   a coil, winding around the stator;
   a bearing holder, holding the bearing;
   a bus bar holder, located on one side or the other side of the bearing holder in an axial direction; and
   a housing, shaped as or substantially shaped as a cylinder having an opening on a top side of the housing in the axial direction, wherein the rotor, the stator, the bearing holder, and the bus bar holder are located in the housing,
   wherein,
   the bus bar holder axially pushes against and is fixed to the bearing holder at a fixing part, a power bus bar and a signal bus bar are integrally formed on the bus bar holder, and a circuit board and a sensor are located between the bus bar holder and the bearing holder.

2. The motor according to claim 1, wherein the bearing holder serves as a cover of the motor, and the bus bar holder is located on the one side of the bearing holder in the axial direction.

3. The motor according to claim 1, wherein the fixing part where the bus bar holder and the bearing holder are fixed is axially closer to the other side in the axial direction than an edge on one side of the housing in the axial direction.

4. The motor according to claim 2, wherein at least a portion of the bearing holder is recessed toward the other side in the axial direction and defines a recess, the sensor is located in the recess, and one side of the recess in the axial direction is covered by the bus bar holder.

5. The motor according to claim 4, wherein the bus bar holder has a protruding edge protruding toward the other side in the axial direction, and an outer circumference of the protruding edge and an inner circumference of the recess of the bearing holder are press-fitted.

6. The motor according to claim 5, wherein the circuit board axially pushes against and is fixed to a surface of the bus bar holder on the other side in the axial direction, or the circuit board axially pushes against and is fixed to a surface of the bearing holder on the one side in the axial direction, and the circuit board is located on an inner side of the protruding edge in the radial direction.

7. The motor according to claim 4, wherein an outer circumference of the bearing holder in the radial direction has an outer circumferential edge press-fitted to the housing, the bearing holder has a riveting part extending in the radial direction, the bus bar holder has a riveted part extending in the radial direction, the riveting part and the riveted part are located on an outer side of the recess in the radial direction, and the riveting part and the riveted part are riveted and fixed in the axial direction.

8. The motor according to claim 2, wherein an end of the signal bus bar is exposed from one side of the bus bar holder facing the bearing holder, the circuit board is arranged on the one side of the bus bar holder facing the bearing holder, and the end of the signal bus bar is inserted into an electrical connection hole of the circuit board.

9. A driving member, comprising:
   a rotor, configured to be centered on and rotatable along a central axis, the rotor having a shaft and a bearing holding the shaft to be rotatable;
   a stator, arranged opposite to the rotor in a radial direction;
   a coil, winding around the stator;
   a bearing holder, holding the bearing;
   a bus bar holder, located on one side or the other side of the bearing holder in an axial direction; and
   a housing, shaped as or substantially shaped as a cylinder having an opening on a top side of the housing in the axial direction, wherein the rotor, the stator, the bearing holder, and the bus bar holder are located in the housing,
   wherein,
   the bus bar holder axially pushes against and is fixed to the bearing holder at a fixing part, a power bus bar and a signal bus bar are integrally formed on the bus bar holder, and a circuit board and a sensor are located between the bus bar holder and the bearing holder.

10. The driving member according to claim 9, wherein the bearing holder serves as a cover of the motor, and the bus bar holder is located on the one side of the bearing holder in the axial direction.

11. The driving member according to claim 9, wherein the fixing part where the bus bar holder and the bearing holder are fixed is axially closer to the other side in the axial direction than an edge on one side of the housing in the axial direction.

12. The driving member according to claim 10, wherein at least a portion of the bearing holder is recessed toward the other side in the axial direction and defines a recess, the sensor is located in the recess, and one side of the recess in the axial direction is covered by the bus bar holder.

13. The driving member according to claim 12, wherein the bus bar holder has a protruding edge protruding toward the other side in the axial direction, and an outer circumference of the protruding edge and an inner circumference of the recess of the bearing holder are press-fitted.

14. The driving member according to claim 13, wherein the circuit board axially pushes against and is fixed to a surface of the bus bar holder on the other side in the axial direction, or the circuit board axially pushes against and is fixed to a surface of the bearing holder on the one side in the axial direction, and the circuit board is located on an inner side of the protruding edge in the radial direction.

15. The driving member according to claim 12, wherein an outer circumference of the bearing holder in the radial direction has an outer circumferential edge press-fitted to the housing, the bearing holder has a riveting part extending in the radial direction, the bus bar holder has a riveted part extending in the radial direction, the riveting part and the riveted part are located on an outer side of the recess in the radial direction, and the riveting part and the riveted part are riveted and fixed in the axial direction.

16. The driving member according to claim 10, wherein an end of the signal bus bar is exposed from one side of the bus bar holder facing the bearing holder, the circuit board is arranged on the one side of the bus bar holder facing the bearing holder, and the end of the signal bus bar is inserted into an electrical connection hole of the circuit board.

* * * * *